US007679344B2

(12) United States Patent
Carlson et al.

(10) Patent No.: US 7,679,344 B2
(45) Date of Patent: Mar. 16, 2010

(54) MICROPROCESSOR DIE WITH INTEGRATED VOLTAGE REGULATION CONTROL CIRCUIT

(75) Inventors: Jeffrey A. Carlson, Portland, OR (US); Edward P. Osburn, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/760,225

(22) Filed: Jun. 8, 2007

(65) Prior Publication Data

US 2007/0229043 A1 Oct. 4, 2007

Related U.S. Application Data

(63) Continuation of application No. 10/795,527, filed on Mar. 8, 2004, now Pat. No. 7,242,172.

(51) Int. Cl.
*G05F 1/44* (2006.01)

(52) U.S. Cl. ........................ 323/272; 323/294; 327/77; 327/538

(58) Field of Classification Search ......... 323/282–288, 323/351, 272, 265, 268; 713/300, 310, 320, 713/322; 361/502; 363/26, 89, 128
See application file for complete search history.

(56) References Cited

U.S. PATENT DOCUMENTS 4,792,899 A 12/1988 Miller
4,825,416 A 4/1989 Tam et al.
5,014,214 A * 5/1991 Glowczewski et al. ...... 700/298
5,764,007 A 6/1998 Jones
5,955,869 A 9/1999 Rathmann
6,023,154 A 2/2000 Martinez
6,087,815 A * 7/2000 Pfeifer et al. ............... 323/282
6,578,416 B1 * 6/2003 Vogel et al. ............... 73/304 C
6,580,597 B2 * 6/2003 Kanouda et al. ............ 361/502
6,704,680 B2 * 3/2004 Amick et al. ............... 702/130
6,747,855 B2 6/2004 Kumar et al.
6,836,103 B2 12/2004 Brooks et al.
6,906,536 B2 6/2005 Pearce et al.
6,906,579 B2 6/2005 Masleid et al.
RE38,891 E 11/2005 Danstrom
6,975,525 B2 * 12/2005 Kernahan .................... 363/98
2005/0040810 A1 * 2/2005 Poirier et al. ............ 324/158.1

OTHER PUBLICATIONS

Ohr, Stephen: "Regulators readied for new Pentiums", Apr. 21, 2003, EE Times, retrieved from URL: http://www.eetimes.com/printableArticle?doc_id=OEG20030421S0014, retrieved on Dec. 17, 2003. 2pgs.

White Paper, "Digital Multiphase Power from Primarion and Intersil Changing the Landscape of Processor Power", Copyright 2002, Primarion, Inc. 4pgs.

* cited by examiner

*Primary Examiner*—Rajnikant B Patel
(74) *Attorney, Agent, or Firm*—Buckely, Maschoff & Talwalkar LLC

(57) ABSTRACT

An integrated circuit die includes a microprocessor and a control circuit to control elements of a voltage regulator to supply power to the microprocessor.

21 Claims, 6 Drawing Sheets

MICROPROCESSOR DIE WITH INTEGRATED VOLTAGE REGULATION CONTROL CIRCUIT

CROSS REFERENCE TO RELATED APPLICATION

This is a continuation of prior U.S. patent application Ser. No. 10/795,527, filed Mar. 8, 2004.

BACKGROUND

As the complexity and operating rate of microprocessors continue to escalate, power supply requirements for microprocessors also become more stringent and costly. In addition, motherboard space remains at a premium.

DETAILED DESCRIPTION

Figure 1:
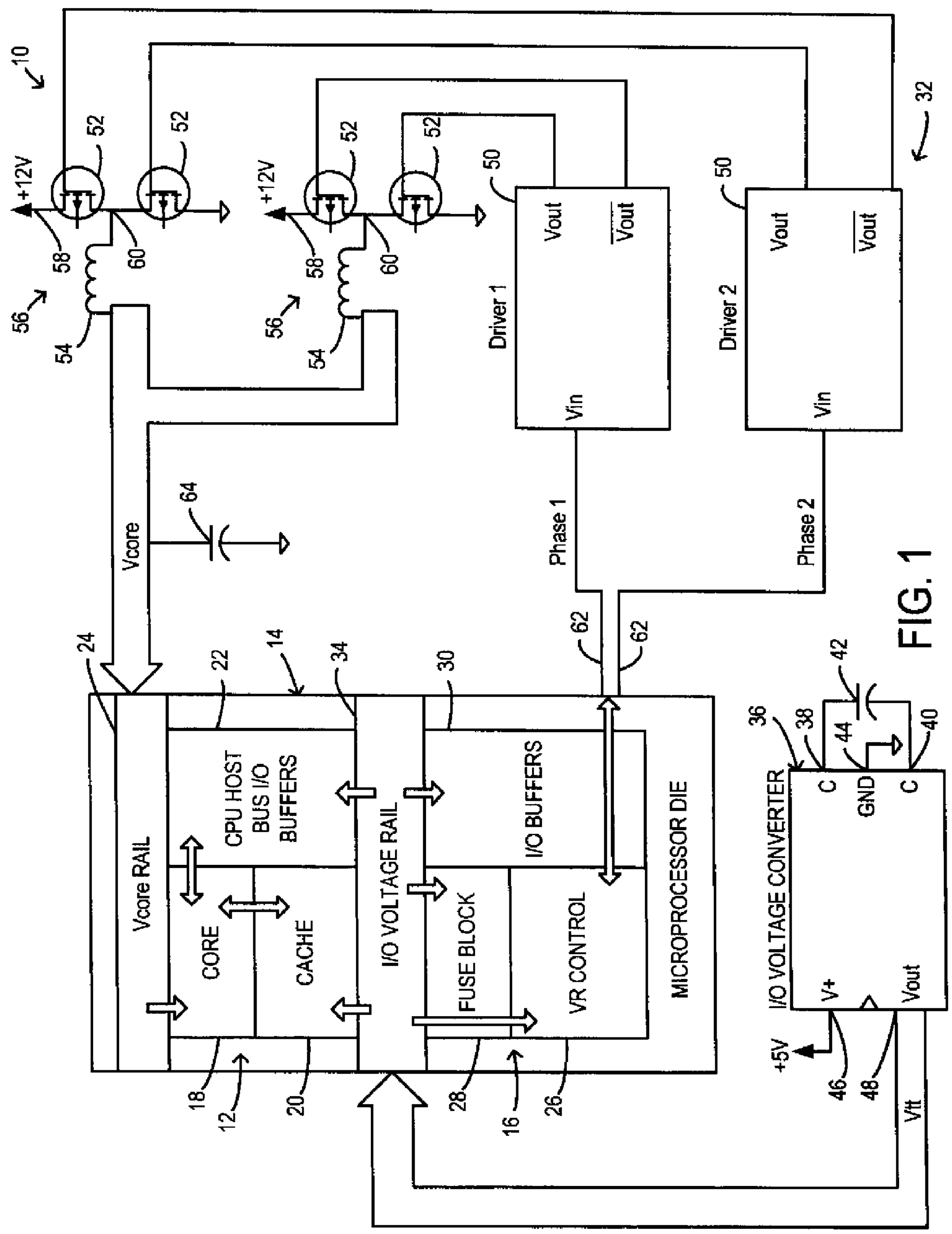
FIG. 1 is a diagram that illustrates a voltage regulator according to some embodiments.

FIG. 1 is a diagram that illustrates a voltage regulator 10 according to some embodiments. A purpose of the voltage regulator 10 is to supply power for a microprocessor 12 formed on a microprocessor die 14. In accordance with some embodiments, some components of the voltage regulator 10 are integrated with the microprocessor 12 by being formed on the microprocessor die 14. More specifically, a voltage regulation control circuit 16 may be formed on the microprocessor die 14.

In accordance with conventional practices, the microprocessor 12 may include such components as a core 18, an on-die cache 20 and input/output buffers 22. As is familiar to those who are skilled in the art, the core 18 may execute instructions that control operation of the microprocessor 12. The instructions may be fetched from program storage or system memory that is off-die and is not shown in the drawing. Power for at least the core 18 is delivered via a Vcore power rail 24.

The voltage regulation control circuit 16 formed on the microprocessor die 14 may include a control block 26, a fuse block 28 and an input/output buffer block 30. The control block 26 may operate to output control signals to control off-die power train components of the voltage regulator 10. The off-die power train components are generally indicated by reference numeral 32. Power for at least part of the voltage regulation control circuit 16, and possibly also for the input/output buffers 22 of the microprocessor 12, may be delivered via an I/O power rail 34.

The power supplied via the I/O power rail 34 may be, for example, at about 1.2 V and may be sourced from a small voltage converter 36 located off-die (i.e., on the motherboard, which is not separately shown in the drawing). The voltage converter 36 may, in some embodiments, be an off-the-shelf item. The voltage converter may have, for example, capacitor terminals 38, 40 coupled to a capacitor 42, a ground terminal 44 coupled to ground, a power input terminal 46 coupled to, e.g., a+5V source (not shown) and a power output terminal 48 which is the source of the power for the Vtt power rail 34.

The off-die power train components 32 controlled by the voltage regulation control circuit 16 may include such conventional components of a switching power supply as PWM (pulse width modulation) drivers 50, FETs (field effect transistors) 52 and inductors 54. It will be observed that the power train components 32 are arranged to implement a conventional multi-phase buck-derived switching power supply. Control signal generation and closing of the feedback loop occur in the on-die voltage regulation control circuit 16. Accordingly, the voltage regulation control circuit 16 may include functional blocks (not separately shown) for functions such as sample-and-hold, analog-to-digital conversion and pulse-width-modulation algorithm processing. Also, as will be seen, the control signal generation may be based on die-sensing, including for example sensing at plural locations in the microprocessor 12.

Further in regard to the off-die power train components 32, it will be noted that each power phase 56 includes a respective pair of FETs 52 coupled in series between a power terminal 58 and ground. Also included in each power phase 56 is a respective inductor 54 coupled to a node 60 at which the respective FETs 52 are coupled to each other. Each power phase 56 further includes a respective PWM driver 50. The PWM drivers 50 each receive a respective phase control signal from the voltage regulation control circuit 16 (via traces 62), and each PWM driver 50 is coupled to the FETs 52 of the respective pair of FETs to selectively activate the FETs. One or more filtering capacitors 64 (only one shown) may be coupled between the inductors 54 and ground.

All of the off-die power train components may be off-the-shelf items, in some embodiments.

Figure 2:
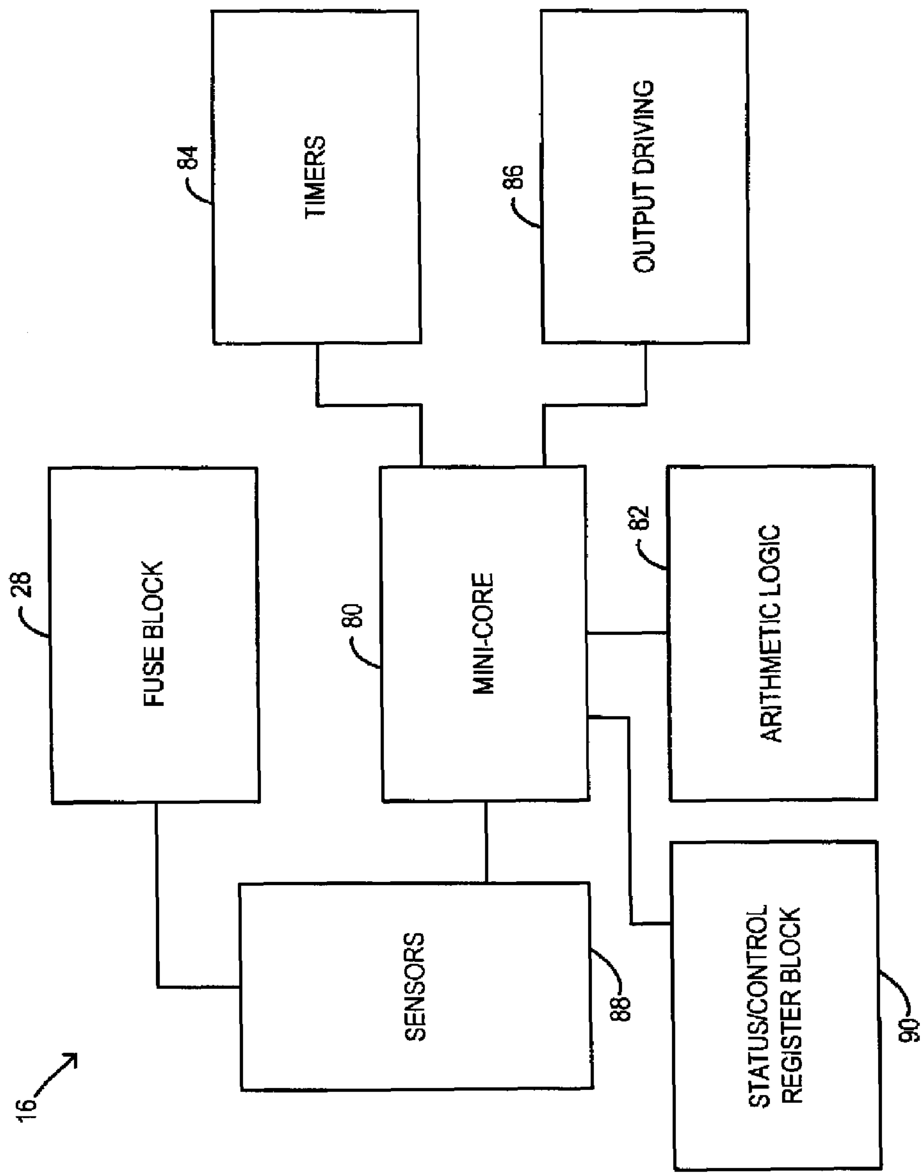
FIG. 2 is a block diagram that shows details of some embodiments of a voltage regulation control circuit integrated with a microprocessor die shown in FIG. 1.

In some embodiments, the voltage regulation control circuit 16 may be laid out in accordance with a conventional analog architecture such as that employed for known discrete voltage regulation controllers currently employed on conventional personal computer motherboards. In other embodiments, the voltage regulation control circuit 16 may be laid out in accordance with a digital architecture. FIG. 2 is a high-level block diagram which illustrates an example of a digital architecture that may be employed for the voltage regulation control circuit 16 in some embodiments.

In the digital architecture illustrated in FIG. 2, the voltage regulation control circuit 16 includes a mini-core 80 which executes instructions to control operation of the voltage regulation control circuit 16. (Storage for the instructions may be provided in another block, which is not shown). To speed up operation of the voltage regulation control circuit 16, repetitive functions such as arithmetic functions, timers, and output signal generation may be off-loaded to, respectively, an arithmetic logic block 82, a timer block 84 and an output driving block 86.

The voltage regulation control circuit 16 as depicted in FIG. 2 may also include a number of sensors 88 which detect conditions at various locations in the microprocessor 12 and/or elsewhere and provide corresponding input to the mini-core 80. The sensors 88 may include either or both of analog and digital sensors (not separately illustrated). In some embodiments, the sensors may be located at a plurality of respective locations in the microprocessor 12 and may detect any one or more of a number of different operating conditions, including voltage, current, thermal and/or microprocessor activity (e.g., monitoring of instruction activity, dispatch rates, pipeline activity, and other functional logic blocks within the core) at one or more locations in the core 18 of the microprocessor 12 and/or at other monitoring points on the microprocessor die 14. In addition, or alternatively, at least some of the sensors 18 may read one or more buffers and/or registers of the microprocessor 12. More generally, the sensors 88 may monitor portions of the pipeline, cache and/or input/output components of the microprocessor 12. In some embodiments, the sensors 88 may include digital comparators. In some embodiments, one or more of the sensors 88 may sense the frequency of a signal or signals at a particular point or points in the microprocessor 12 or more generally in the microprocessor die 14. (As is implied by the above discussion of sensors 88, portions of the voltage regulation control circuit 16 may be distributed through the microprocessor 12.) The sensors 88 may also include, in some embodiments, one or more motherboard sensing connections.

Also shown in FIG. 2 is status and control register block 90. The status and control register block 90 may be used to provide status, control, and handshaking in a bi-directional fashion between the mini-core 80 and the microprocessor 12. In some embodiments the mini-core 80 may communicate VR operating parameters and conditions, power levels, and other functional information to the microprocessor 12 for use by software or logic inside the microprocessor 12. Similarly, the microprocessor 12 may use the status and control register 90 to communicate to the mini-core 80 voltage levels, power levels, operating frequency, and other functional parameters that may affect the response and operating state of the voltage regulation control circuit 16.

Also indicated as part of the voltage regulation control circuit 16 as depicted in FIG. 2 is the fuse block 28 which was also mentioned in connection with FIG. 1. The fuse block 28 may, for example, be programmed during testing of the microprocessor die 14 to, for example, tune operation of the voltage regulation control circuit 16 to particular characteristics of the microprocessor die 14 (which may exhibit manufacturing variances from part to part) and/or particular characteristics of an integrated circuit (IC) package (not separately shown in FIGS. 1 and 2) in which the microprocessor die 14 is mounted.

In some embodiments of the voltage regulation control circuit 16 laid out in accordance with a digital architecture, the mini-core 80 may be omitted, and at least a portion of the voltage regulation control circuit 16 may be formed as a programmable logic device (PLD).

Figure 3:
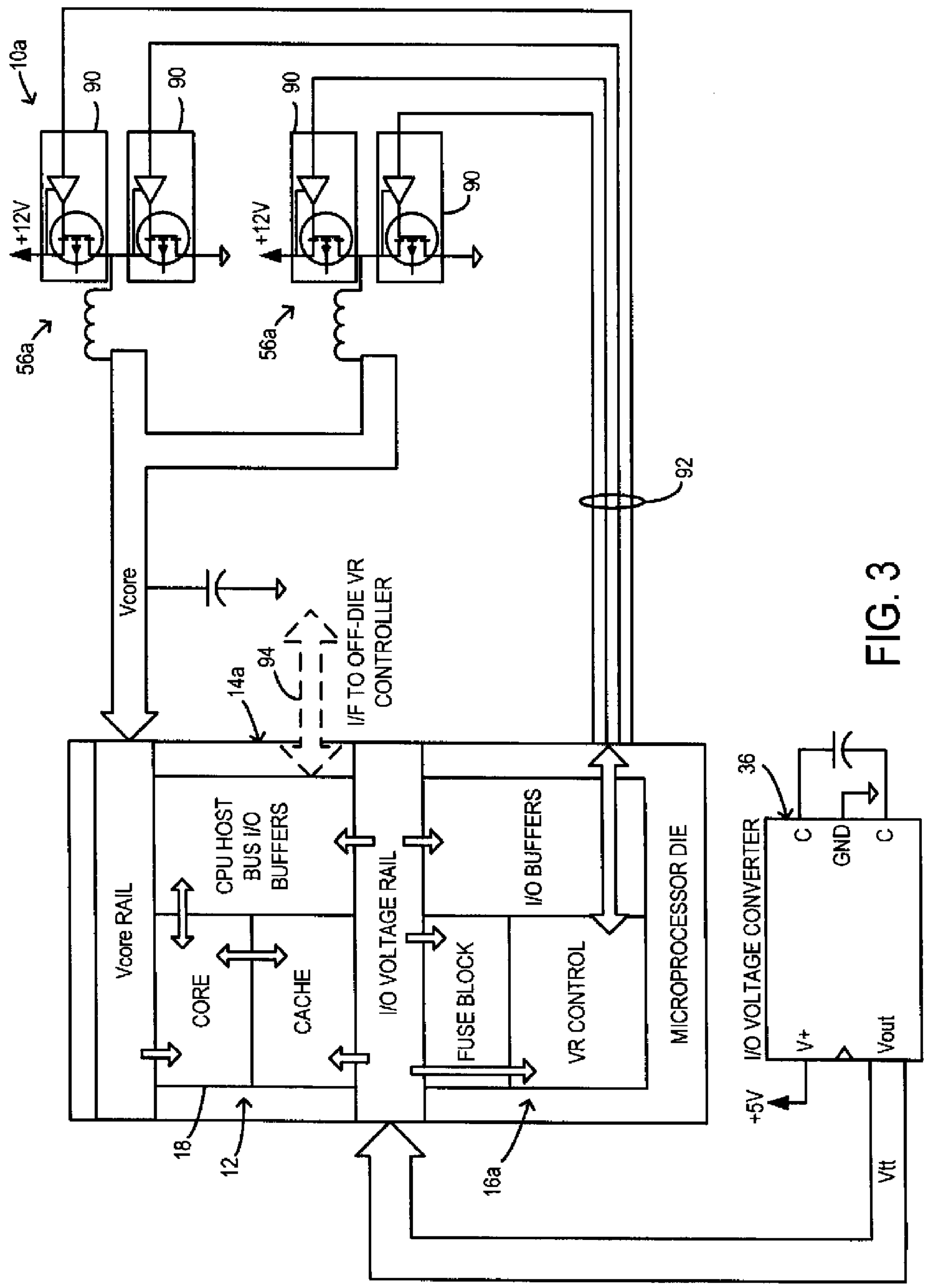
FIG. 3 is a diagram that illustrates a voltage regulator according to some other embodiments.

FIG. 3 is a diagram that illustrates a voltage regulator 10*a* according to some other embodiments.

The voltage regulator 10*a* depicted in FIG. 3 is generally similar to the voltage regulator 10 of FIG. 1. The differences between the two will now be described.

The arrangement of the power phases 56*a* of the voltage regulator 10*a* is somewhat different from that of the power phases 56 of the voltage regulator 10, and the voltage regulation control circuit 16*a* of the voltage regulator 10*a* is modified accordingly relative to the voltage regulation control circuit 16 of the voltage regulator 10 (and the microprocessor die 14*a* of FIG. 3 consequently differs from the microprocessor die 14 of FIG. 1 at least in aspects relative to the voltage regulation control circuit). More specifically, in the power phases 56 of the voltage regulator 10, each power phase 56 includes two discrete FETs 52 and a PWM driver 50 to drive the two FETs 52. On the other hand, in the power phases 56*a*, each power phase 56*a* include two FET-driver combination circuits 90. Thus, each power phase 56*a* shown in FIG. 3 requires two control signals (one for each FET-driver combination circuit 90) from the voltage regulation control circuit 16*a*, and the voltage regulation control circuit 16*a* is modified accordingly relative to the voltage regulation control circuit 16. That is, assuming that there are two power phases 56*a* as illustrated in FIG. 3, then the voltage regulation control circuit 16*a* may provide the following four control signals over traces 92: Phase_1, Phase_1~, Phase_2, and Phase_2~. By contrast, the voltage regulation control circuit 16 of FIG. 1, provides only the two control signals, Phase_1 and Phase_2.

Consequently, in the voltage regulator 10*a* of FIG. 3, the two sides of each power phase 56*a* can be driven independently of each other. The voltage regulation control circuit 16*a* of the voltage regulator 10*a* may be laid out in accordance with a digital architecture to facilitate more flexible driving of the power phases 56*a*. In some embodiments, the voltage regulation control circuit 16*a* may be operated to implement some or all of the following techniques:

(A) Transient response that emulates phase lead-lag regulation by extending the FET drive duty cycle and/or responding to an Icc load step with reduced latency, on a per phase basis.

(B) Asynchronous transient suppression in which all control FETs are used to respond to a load step transient, to reduce the energy transfer time from 12V to Vcore (which may be 1V or less).

(C) Phase idling for light-load conditions, in which all FETs may be turned off simultaneously to allow the synchronous FET body diodes (not separately shown) to dump the energy in the inductor during a load release transient condition. As a result voltage overshoot at the core 18 may be reduced, and current back drive into the VR input supply plane may be prevented.

In some embodiments, the microprocessor 12 (in either or both of the embodiments of FIGS. 1 and 3) may include a conventional interface 94 (shown in phantom in FIG. 3) to provide data and/or status signals to a conventional voltage regulation controller (not shown) that may be provided on the motherboard (not shown). For example, by way of the interface 94 the microprocessor 12 may provide to an off-chip VR controller six bits of voltage identification data, a one-bit VID_PWRGOOD signal and two bits of load line identification data. Providing such an interface, notwithstanding that a voltage regulation control circuit is integrated with the microprocessor, may aid in testing or debugging the integrated microprocessor/voltage regulation controller, and may allow the microprocessor to be used in legacy platforms.

Figure 4:
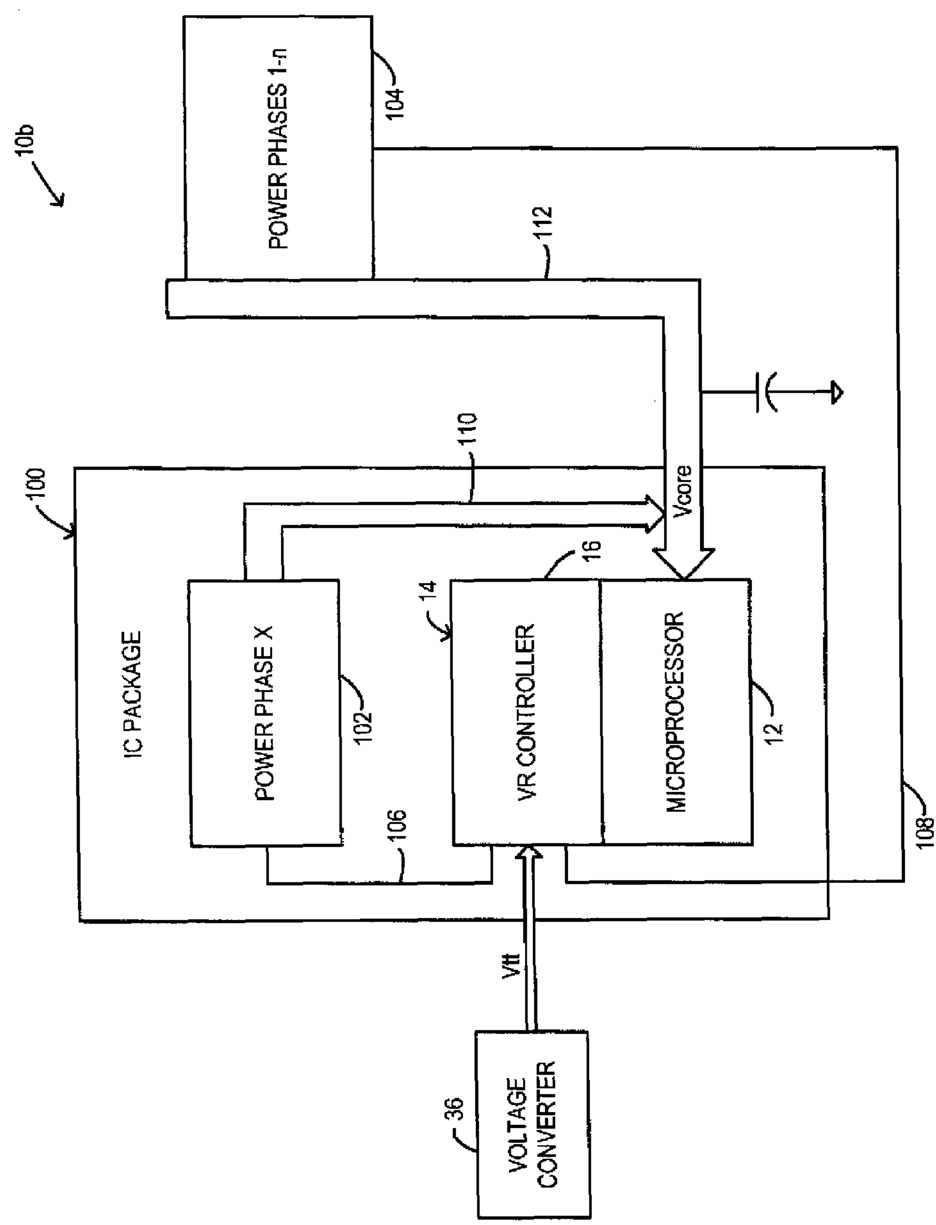
FIG. 4 is a diagram that illustrates a voltage regulator according to still some other embodiments.

FIG. 4 is a diagram that illustrates a voltage regulator 10*b* according to still some other embodiments.

Voltage regulator 10*b* includes an integrated circuit (IC) package 100 and a microprocessor die 14 mounted in the IC package 100. The microprocessor die 14 may be as described above in connection with FIG. 1, and includes a microprocessor 12 and a voltage regulation (VR) control circuit 16. In some embodiments, the microprocessor die shown in FIG. 4 may be like the microprocessor die 14*a* of FIG. 3.

The voltage regulator 10*b* further includes off-die power train elements constituted by (a) a power phase 102 mounted in the IC package 100, and (b) one or more power phases 104 mounted on the motherboard (not separately shown) or a daughterboard (not separately shown), but not in the IC package 100. The power phases 102, 104 may be like the power phases 56 or 56*a* shown respectively in FIGS. 1 and 3.

The voltage regulation control circuit 16 controls the power phases 102, 104 by control signals transmitted via signal paths 106, 108 respectively. If necessary, each signal path 106, 108 may include more than one signal trace (not separately shown). Under the control of the voltage regulation control circuit 16, the power stages 102, 104 supply power to the microprocessor 12 via power transmission paths 110, 112. As in the embodiments of FIGS. 1 and 3, power for the voltage regulation control circuit 16 is supplied from a small voltage converter 36.

By packaging at least one power phase with the microprocessor die in which a VR controller is integrated, greater flexibility in the power delivery architecture may be realized. For example, the presence of a power phase on the microprocessor package may make it possible to accommodate a microprocessor upgrade in a previously existing motherboard power delivery environment, notwithstanding increased power demands for the microprocessor. As a result, the design life of motherboard power delivery systems may be extended. Further, the number of pins required for power delivery to the microprocessor package may be reduced and/or the response of the voltage regulator may be improved.

Figure 5:
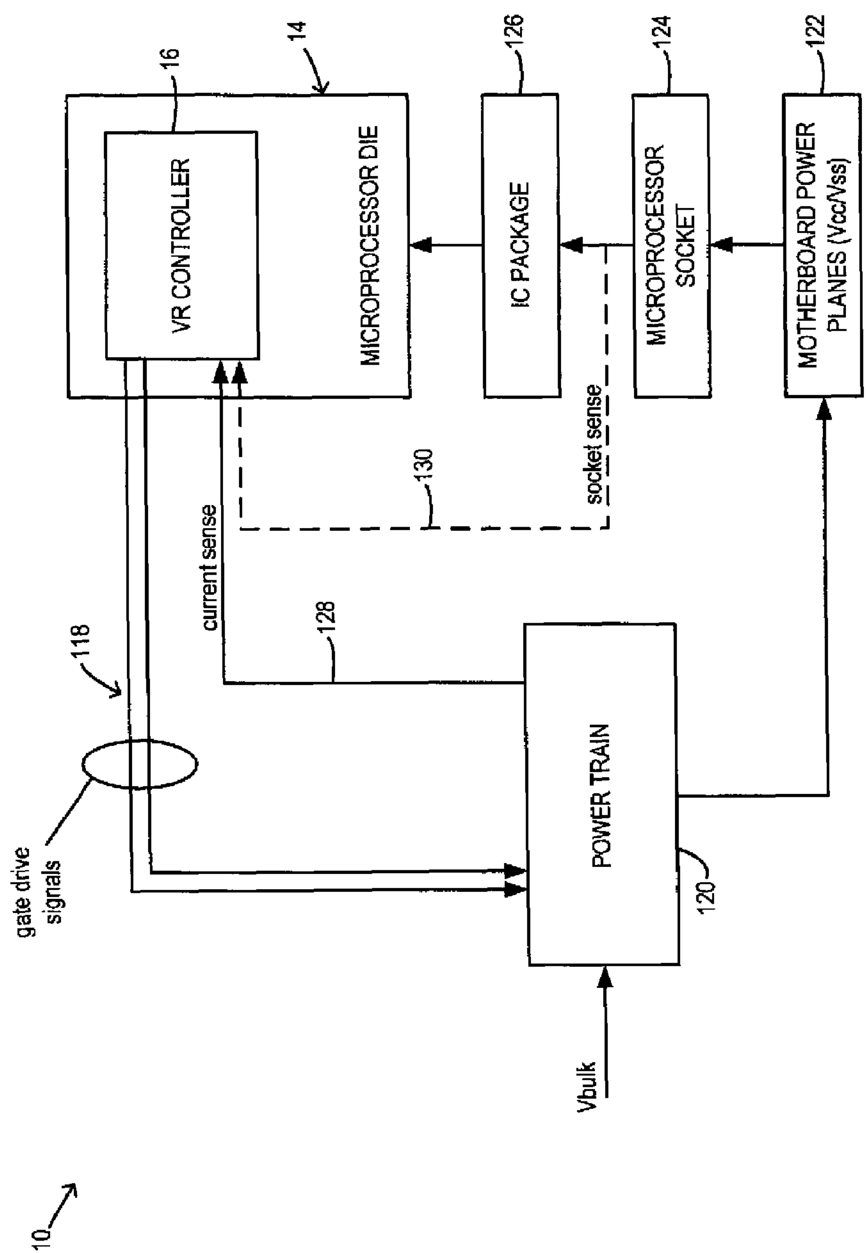
FIG. 5 is a diagram that shows some power and signal flows in a voltage regulator according to one of FIGS. 1, 3 and 4.

FIG. 5 is a diagram that shows some power and signal flows in a voltage regulator 10, which may be as depicted in FIG. 1, or may alternatively be like the voltage regulators of FIGS. 3 or 4.

As seen from FIG. 5, a voltage regulation control circuit 16, integrated with a microprocessor die 14, provides control signals via traces 118 to power train components 120 (which may include one or more phases 56 (FIG. 1), 56*a* (FIG. 3) or 102, 104 (FIG. 4)). Continuing to refer to FIG. 5, the power train components 120, in turn, supply power to the microprocessor die 14 (and more specifically to core 18 (FIG. 1, not shown separately in FIG. 5) via motherboard power planes 122, a microprocessor socket 124 on the motherboard (not separately shown), and an IC package 126 which is mounted in the socket 124, and in which the microprocessor die 14 is mounted.

In addition to, or instead of, the die sense input signals referred to above in connection with FIG. 2, the voltage regulation control circuit 16 may receive one or more current sense input signals, as indicated at 128 in FIG. 5, from the power train components 120. Moreover, in some embodiments, and as indicated in phantom at 130, the voltage regulation control circuit 16 may receive a voltage and/or current sense signal taken at the socket 124. On the basis of one or more of these input signals, the voltage regulation control circuit 16 generates suitable control signals to control operation of the power train components 120 to supply power to the microprocessor die 14.

By integrating a voltage regulation control circuit with a microprocessor on a shared die, the discrete VR controller conventionally provided on the motherboard may be eliminated. As a result the overall cost of the motherboard may be decreased and space on the motherboard may be conserved. In terms of taking up space on the microprocessor die, with utilization of current or future advanced IC technologies the amount of space required for the integrated voltage regulation control circuit may be relatively small. Moreover, the pin-out for the VR function may be reduced by integration of the VR controller on the microprocessor die.

Integration of the VR control function on the microprocessor die may provide other benefits as well. For example, time-to-market for microprocessor and/or VR controller upgrades may be reduced, since the need to develop a next generation discrete VR controller is eliminated. Integration of the VR control function on-die may also allow for greater interaction between the VR function and the microprocessor and/or the operating system, leading to more intelligent and/or more responsive voltage regulator performance. In addition, the VR control/microprocessor integration may permit point-of-load input sensing for the VR control function, which also may improve voltage regulator performance. Efficient VR control operation may be further enhanced by the high processing speed that may be achievable for the VR control circuit when integrated using the advanced fabrication technologies now or hereafter employed for microprocessors.

Still further, with the VR control function on-die, it may be possible to tune the VR control circuit to the particular characteristics of the microprocessor and/or package, thereby potentially enhancing the operating frequency of the microprocessor in some cases, improving bin-split and/or allowing reduction of power supplied to the microprocessor.

In another advantageous feature of some embodiments, the provision of a separate voltage converter for powering up the VR control circuit, which then activates the power train for supplying core power, inherently assures proper power-on sequencing, without needing the conventionally-provided additional logic that is typically employed to prevent a discrete VR controller from reading invalid signals from the microprocessor on power-up.

Figure 6:
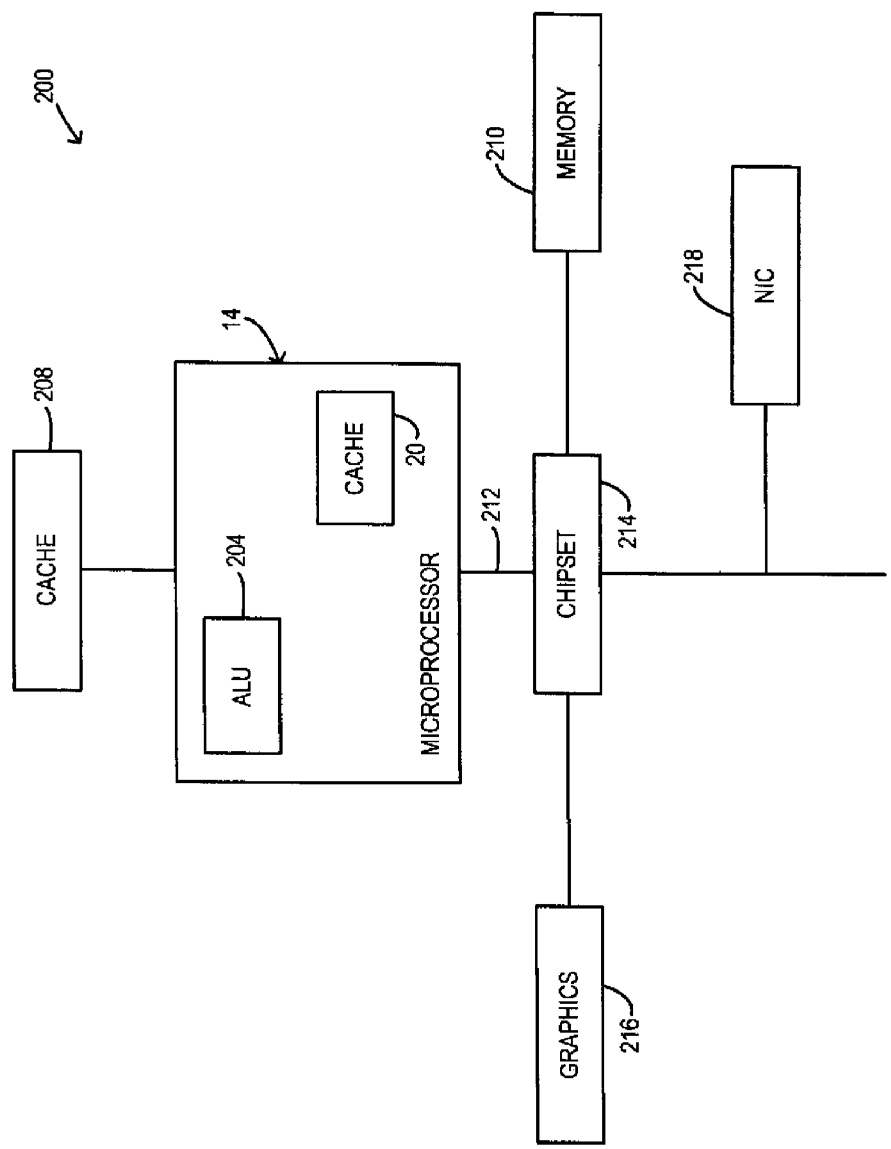
FIG. 6 is a block diagram of a computer system that includes a microprocessor die according to one of FIGS. 1, 3 and 4.

FIG. 6 is a block diagram of a computer system 200 that includes a microprocessor die, such as the die 14 shown in FIG. 1, in which a voltage regulation control circuit 16 (FIG. 1, not separately shown in FIG. 6) is integrated with a microprocessor. Continuing to refer to FIG. 6, the microprocessor die 14 may comprise many sub-blocks, such as arithmetic logic unit (ALU) 204 and on-die cache 20. Microprocessor die 14 may also communicate to other levels of cache, such as off-die cache 208. Higher memory hierarchy levels, such as system memory 210, are accessed via host bus 212 and chipset 214. In addition, other off-die functional units, such as graphics accelerator 216 and network interface controller (NIC) 218, to name just a few, may communicate with microprocessor die 14 via appropriate busses or ports. Although not shown in FIG. 6, the computer system 200 may also include the off-die voltage regulator components described above.

In some embodiments described above, the voltage regulator has two power phases. In other embodiments the voltage regulator may be single-phase or may have three or more power phases.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. An integrated circuit (IC) die, comprising:

a microprocessor; and a control circuit to control elements of a voltage regulator to supply power to the microprocessor;

wherein:

the control circuit includes a plurality of sensors, the microprocessor includes a plurality of sensor locations in the microprocessor, one or more of the sensors are located at each of said sensor locations in the microprocessor; and one or more of said sensors at said plurality of sensor locations are for reading one or more buffers and/or registers of the microprocessor.

2. The IC die of claim 1, wherein at least some of the sensors are analog sensors.

3. The IC die of claim 2, wherein some of the sensors are digital sensors.

4. The IC die of claim 1, wherein at least some of the sensors are digital sensors.

5. The IC die of claim 1, wherein the control circuit is laid out in accordance with an analog architecture.

6. The IC die of claim 1, wherein the control circuit is laid out in accordance with a digital architecture.

7. The IC die of claim 6, wherein the control circuit includes a core to execute instructions.

8. The IC die of claim 6, wherein the control circuit includes an arithmetic logic block.

9. The IC die of claim 6, wherein the control circuit includes a timer block.

10. The IC die of claim 6, wherein the control circuit includes an output driving block.

11. The IC die of claim 6, wherein the control circuit includes a fuse block.

12. A system comprising:

an IC die which includes a microprocessor and a control circuit for a voltage regulator; and a plurality of power phase circuits, each of the power phase circuits including:

a pair of field effect transistors (FETs) coupled in series between a power terminal and ground;

an inductor coupled to a node at which the FETs are coupled to each other; and at least one driver coupled to the control circuit to receive a control signal from the control circuit, the at least one driver also coupled to at least one of the FETs to selectively activate the FETs;

wherein:

the control circuit includes a plurality of sensors, the microprocessor includes a plurality of sensor locations in the microprocessor, one or more of the sensors are located at each of said sensor locations in the microprocessor; and one or more of said sensors at said plurality of sensor locations are for reading one or more buffers and/or registers of the microprocessor.

13. A system comprising:

a die comprising a microprocessor; and a chipset in communication with the microprocessor;

wherein the die includes a control circuit to control elements of a voltage regulator to supply power to the microprocessor;

wherein:

the control circuit includes a plurality of sensors, the microprocessor includes a plurality of sensor locations in the microprocessor, one or more of the sensors are located at each of said sensor locations in the microprocessor; and one or more of said sensors at said plurality of sensor locations are for reading one or more buffers and/or registers of the microprocessor.

14. The system of claim 12, further comprising a voltage converter coupled to the control circuit to supply power to the control circuit.

15. The system of claim 12, further comprising at least one capacitor coupled between the inductors and ground.

16. The system of claim 13, further comprising a voltage converter coupled to the control circuit to supply power to the control circuit, said voltage converter separate from said voltage regulator.

17. The IC die of claim 1, wherein at least one of the sensors detects a voltage condition at at least one of said sensor locations in the microprocessor.

18. The IC die of claim 1, wherein at least one of the sensors detects an electrical current condition at at least one of said sensor locations in the microprocessor.

19. The IC die of claim 1, wherein at least one of the sensors detects a thermal condition at at least one of said sensor locations in the microprocessor.

20. The IC die of claim 1, wherein at least one of the sensors detects a microprocessor activity condition at at least one of said sensor locations in the microprocessor.

21. The system of claim 12, further comprising a voltage converter coupled to the control circuit to supply power to the control circuit, said voltage converter separate from said power phase circuits.

* * * * *